(12) United States Patent
Cao et al.

(10) Patent No.: US 10,499,258 B2
(45) Date of Patent: Dec. 3, 2019

(54) USING A GEOMETRY INDICATOR IN HETNET DEPLOYMENTS

(71) Applicant: ZTE Wistron Telecom AB, Stockholm (SE)

(72) Inventors: Aijun Cao, Stockholm (SE); Thorsten Schier, Stockholm (SE); Jan Johansson, Norrfjärden (SE); Yonghong Gao, Stockholm (SE); Patrick Svedman, Stockholm (SE); Bojidar Hadjiski, Stockholm (SE)

(73) Assignee: ZTE Wistron Telecom AB, Stockholm (SE)

( * ) Notice: Subject to any disclaimer, the term of this patent is extended or adjusted under 35 U.S.C. 154(b) by 50 days.

(21) Appl. No.: 14/890,119

(22) PCT Filed: May 7, 2014

(86) PCT No.: PCT/SE2014/050558
§ 371 (c)(1),
(2) Date: Nov. 9, 2015

(87) PCT Pub. No.: WO2014/182230
PCT Pub. Date: Nov. 13, 2014

(65) Prior Publication Data
US 2016/0088495 A1   Mar. 24, 2016

Related U.S. Application Data

(60) Provisional application No. 61/821,175, filed on May 8, 2013, provisional application No. 61/859,696, filed
(Continued)

(51) Int. Cl.
*H04W 16/32* (2009.01)
*H04B 17/27* (2015.01)
(Continued)

(52) U.S. Cl.
CPC ............ *H04W 16/32* (2013.01); *H04B 17/27* (2015.01); *H04L 27/2655* (2013.01);
(Continued)

(58) Field of Classification Search
CPC ... H04W 84/045; H04W 48/16; H04W 48/08; H04W 88/08; H04W 64/003;
(Continued)

(56) References Cited

U.S. PATENT DOCUMENTS 9,258,786 B2   2/2016   Cao et al.
9,357,528 B2   5/2016   Gao et al.
(Continued)

FOREIGN PATENT DOCUMENTS

EP   2 187 553 A1   5/2010
EP   2 282 581 A1   2/2011
(Continued)

OTHER PUBLICATIONS

Japanese Office Action dated Jun. 20, 2017 for Japanese Application No. 2016-512876, filed May 7, 2014, with English translation (6 pages).
(Continued)

*Primary Examiner* — Kwasi Karikari
(74) *Attorney, Agent, or Firm* — Perkins Coie LLP

(57) ABSTRACT

In a heterogeneous network deployment that includes a macro base station and one or more low power nodes, a geometry indicator signal is transmitted to facilitate the determination of geometry or location at a user equipment. The geometry indicator, in general, is transmitted on the same or different frequency as the data signal transmission and is transmitted over a range that is same or different from that of the data signal transmission. The geometry indicator signal may be transmitted by the macro base station, the low power nodes or both.

66 Claims, 15 Drawing Sheets

Related U.S. Application Data on Jul. 29, 2013, provisional application No. 61/870,583, filed on Aug. 27, 2013.

(51) Int. Cl.

| | | |
|---|---|---|
| *H04L 27/26* | (2006.01) | |
| *H04W 16/16* | (2009.01) | |
| *H04W 28/02* | (2009.01) | |
| *H04W 72/04* | (2009.01) | |
| *H04W 48/16* | (2009.01) | |
| *H04W 84/04* | (2009.01) | |
| *H04W 92/10* | (2009.01) | |
| *H04W 92/12* | (2009.01) | |
| *H04W 92/20* | (2009.01) | |
| *H04L 5/00* | (2006.01) | |

(52) U.S. Cl.
CPC ......... *H04L 27/2691* (2013.01); *H04W 16/16* (2013.01); *H04W 28/0226* (2013.01); *H04W 72/0426* (2013.01); *H04L 5/0048* (2013.01); *H04L 5/0053* (2013.01); *H04L 5/0091* (2013.01); *H04W 48/16* (2013.01); *H04W 84/045* (2013.01); *H04W 92/10* (2013.01); *H04W 92/12* (2013.01); *H04W 92/20* (2013.01); *Y02D 70/1262* (2018.01); *Y02D 70/25* (2018.01)

(58) Field of Classification Search
CPC ........... H04W 72/005; H04W 36/0061; H04W 4/025; H04W 48/04
See application file for complete search history.

(56) References Cited

U.S. PATENT DOCUMENTS

| | | | |
|---|---|---|---|
| 2001/0024430 | A1 | 9/2001 | Sekine et al. |
| 2003/0220765 | A1 | 11/2003 | Overy et al. |
| 2007/0254626 | A1 | 11/2007 | Ahlgren |
| 2009/0135761 | A1 | 5/2009 | Khandekar et al. |
| 2010/0008346 | A1 | 1/2010 | Shirakata et al. |
| 2010/0080139 | A1* | 4/2010 | Palanki ............... H04B 7/2606 370/252 |
| 2010/0167743 | A1 | 7/2010 | Palanki et al. |
| 2010/0182903 | A1 | 7/2010 | Palanki et al. |
| 2010/0260156 | A1* | 10/2010 | Lee ................... H04W 56/0035 370/336 |
| 2010/0302978 | A1 | 12/2010 | Roh et al. |
| 2010/0315967 | A1 | 12/2010 | Patel et al. |
| 2011/0047029 | A1* | 2/2011 | Nair ................... G06Q 30/0254 705/14.52 |
| 2011/0053604 | A1* | 3/2011 | Kim ..................... H04W 16/16 455/450 |
| 2011/0081927 | A1 | 4/2011 | Gerstenberger et al. |
| 2012/0028673 | A1 | 2/2012 | Jeong |
| 2012/0046026 | A1 | 2/2012 | Chande et al. |
| 2012/0142334 | A1 | 6/2012 | Sato et al. |
| 2012/0188897 | A1 | 7/2012 | Shen |
| 2012/0213109 | A1 | 8/2012 | Xu et al. |
| 2013/0044692 | A1* | 2/2013 | Nory .................... H04L 5/0048 370/329 |
| 2013/0142291 | A1 | 6/2013 | Dinan |
| 2013/0210431 | A1 | 8/2013 | Abe et al. |
| 2013/0265981 | A1 | 10/2013 | Yang et al. |
| 2013/0272188 | A1 | 10/2013 | Seo et al. |
| 2014/0064211 | A1 | 3/2014 | Cao et al. |
| 2014/0092861 | A1 | 4/2014 | Gao et al. |
| 2014/0119264 | A1 | 5/2014 | Shauh et al. |
| 2014/0133337 | A1 | 5/2014 | Lee et al. |
| 2015/0029877 | A1 | 1/2015 | Chen et al. |
| 2015/0326335 | A1 | 11/2015 | Chen et al. |
| 2016/0219425 | A1 | 7/2016 | Schier et al. |
| 2016/0234878 | A1 | 8/2016 | Svedman et al. |
| 2017/0288837 | A1 | 10/2017 | Namgoong et al. |

FOREIGN PATENT DOCUMENTS

| | | |
|---|---|---|
| EP | 2 448 338 A1 | 5/2012 |
| EP | 2 523 510 A1 | 11/2012 |
| JP | 2005-123898 A | 12/2005 |
| JP | 2008-035079 A | 2/2008 |
| JP | 2009-089186 A | 4/2009 |
| JP | 2011-009866 A | 1/2011 |
| JP | 2011-142550 A | 7/2011 |
| JP | 2012-039168 A | 2/2012 |
| JP | 2012-138967 A | 7/2012 |
| JP | 2013-038818 A | 2/2013 |
| WO | 2005/055462 A1 | 6/2005 |
| WO | 2009/064700 A2 | 5/2009 |
| WO | 2011/018906 A1 | 2/2011 |
| WO | 2011/103475 A1 | 8/2011 |
| WO | 2013/009052 A2 | 1/2013 |
| WO | 2013/120265 A1 | 8/2013 |
| WO | 2013/137700 A1 | 9/2013 |
| WO | 2015/047171 A1 | 4/2015 |

OTHER PUBLICATIONS

Japanese Office Action dated Jun. 6, 2017 for Japanese Application No. 2016-517539, filed Sep. 25, 2014, with English translation (13 pages).

3GPP Technical Specification, "3rd Generation Partnership Project; Technical Specification Group Radio Access Network; Evolved Universal Terrestrial Radio Access (E-UTRA); Multiplexing and channel coding (Release 10)," 3GPP TS 36.212 v 10.6.0, 79 pages, Jun. 2012.

3GPP Technical Specification, "3rd Generation Partnership Project; Technical Specification Group Radio Access Network; Evolved Universal Terrestrial Radio Access (E-UTRA); Physical Channels and Modulation (Release 10)," 3GPP TS 36.211 v 10.5.0, 101 pages, Jun. 2012.

3GPP Technical Specification, "3rd Generation Partnership Project; Technical Specification Group Radio Access Network; Physical layer procedures (FDD) (Release 11)," 3GPP TS 25.214 v11.2.0, 108 pages, Jun. 2012.

Fujitsu, "Enhancement of existing mechanism for operational carrier selection," 3GPP TSG-RAN WG3 #76, R3-121306, 3 pages, May 2012.

Fujitsu, "Signalling enhancement for the operational carrier selection," 3GPP TSG-RAN WG3 #75bis, R3-120640, 3 pages, Mar. 2012.

International Search Report and Written Opinion dated Sep. 22, 2014 for International Application No. PCT/SE2014/050558, filed on May 7, 2014 (14 pages).

Japanese Office Action dated Jul. 29, 2014 for Japanese Application No. 2013-178248, filed Aug. 29, 2013, with English translation (8 pages).

UK Search and Examination Report dated Jan. 30, 2014 for UK Patent Application No. 1315301.0, filed Aug. 28, 2013 (6 pages).

ZTE, "RE Mapping for Small Cell Discovery Signal Based on Unused REs," 3GPP TSG-RAN WG1 #73, R1-132084, 5 pages, May 2013.

Japanese Office Action dated Aug. 15, 2018 for Japanese Application No. 2017-202242, filed May 7, 2014, with English translation (10 pages).

ITRI, "Inter-Frequency Small Cell Detection," 3GPP TSG-RAN WG2 Meeting#79 R2-123622, 4 pages, Aug. 2012.

Motorola Mobility, "Small Cell Discovery," 3GPP TSG-RAN WG1 #72bis R1-131519, 3 pages, Apr. 2013.

International Search Report and Written Opinion dated Feb. 3, 2015 for International Application No. PCT/SE2014/051099, filed on Sep. 25, 2014 (15 pages).

Japanese Office Action dated Nov. 15, 2016 for Japanese Application No. 2016-512876, filed May 7, 2014, with English translation (9 pages).

\* cited by examiner

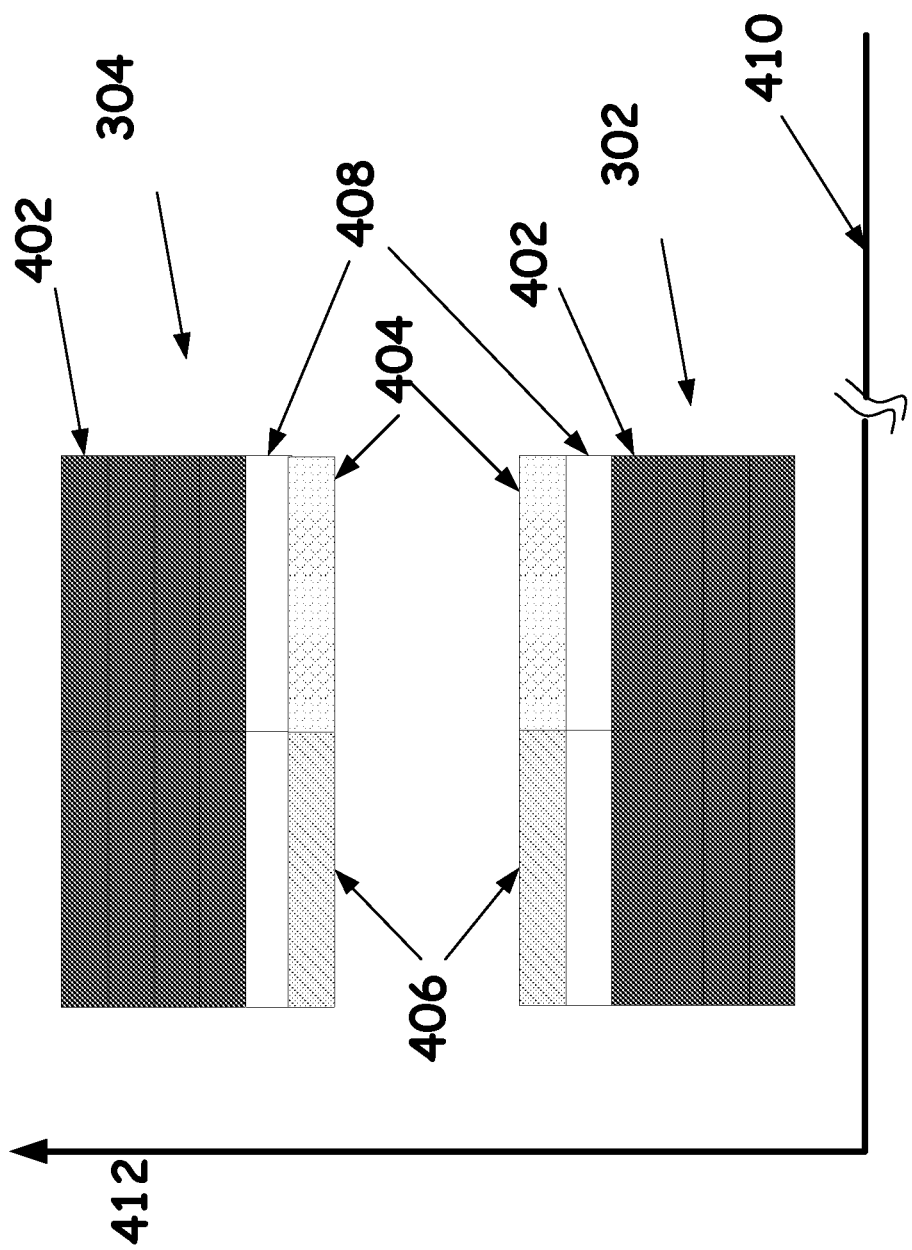

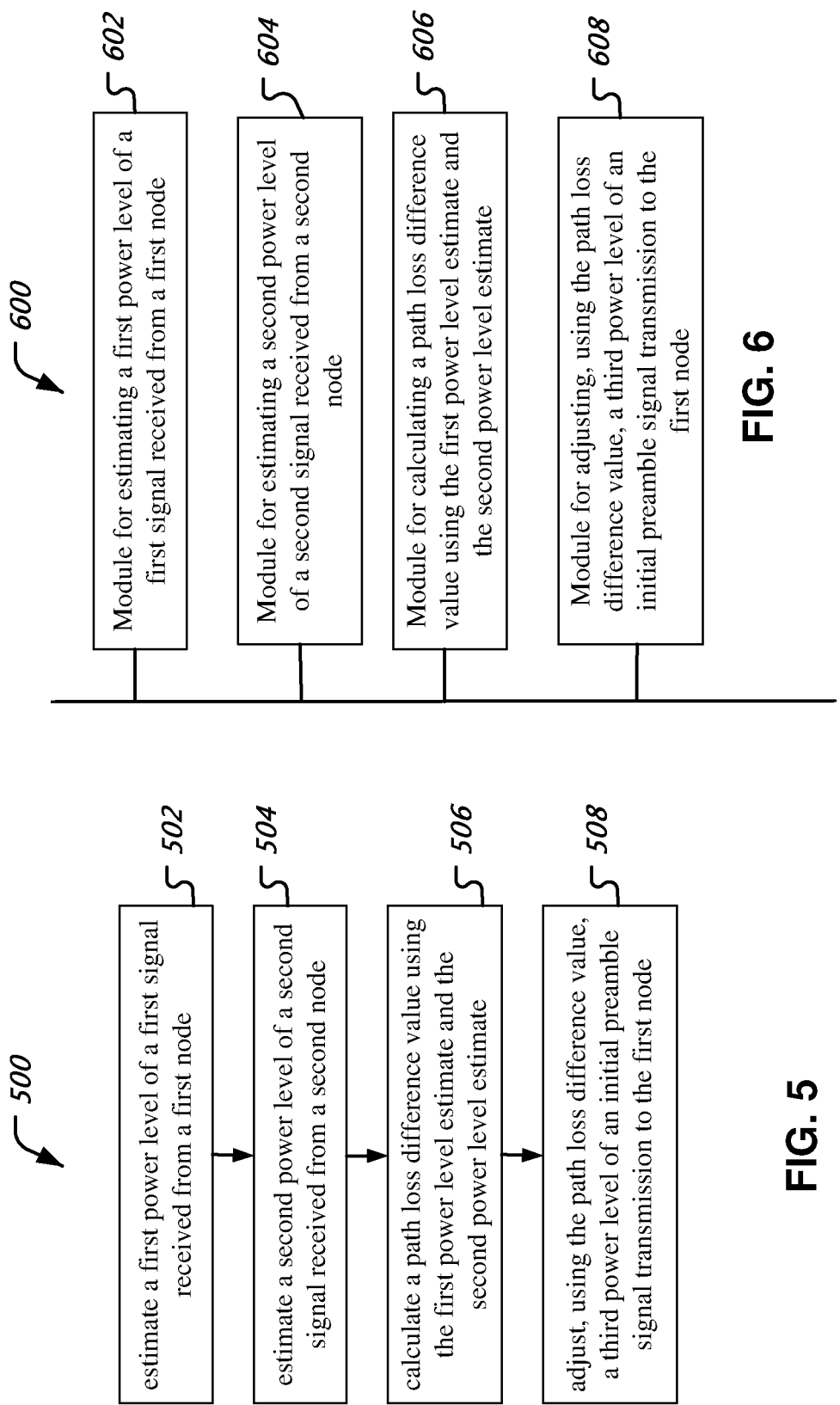

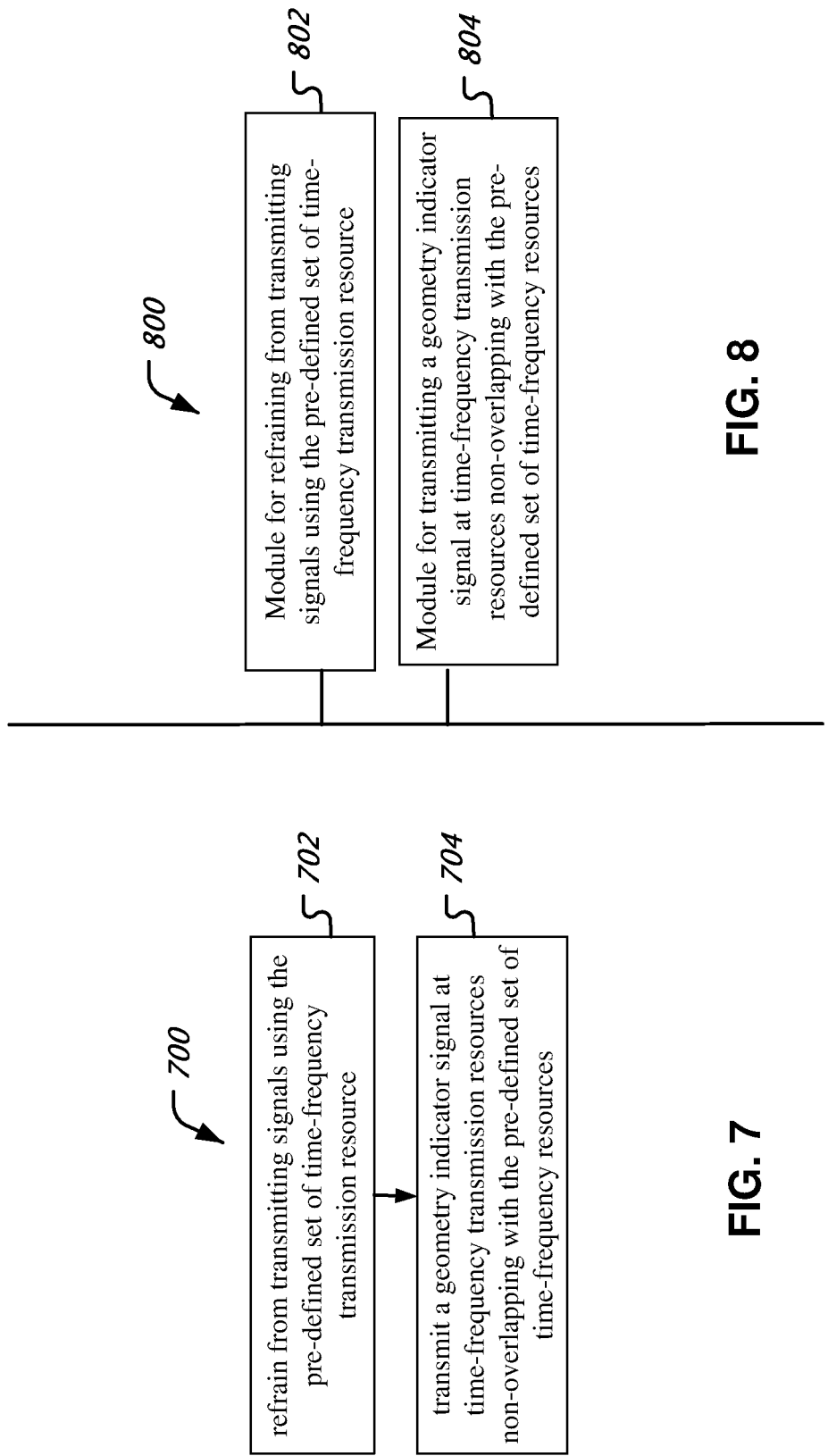

USING A GEOMETRY INDICATOR IN HETNET DEPLOYMENTS

CROSS-REFERENCE TO RELATED APPLICATIONS

This patent document claims the benefit of priority to U.S. Provisional Patent Application No. 61/821,175, filed on May 8, 2013, U.S. Provisional Patent Application No. 61/859, 696, filed on Jul. 29, 2013, and U.S. Provisional Patent Application No. 61/870,583, filed on Aug. 27, 2013. The entire content of the before-mentioned patent applications are incorporated by reference herein.

BACKGROUND

This document relates to cellular telecommunication systems, especially to a heterogeneous network where one or more low-power nodes are deployed in a macro base station's coverage.

Cellular communication systems are being deployed all over the world to provide not only voice services, but also mobile broadband data and multimedia services. There is an ever-growing need for higher bandwidth because new mobile applications are continuously being released that consume higher and higher amount of data, e.g., for video and graphics. As mobile system operators deploy these bandwidth-hungry applications and increase the geographic areas covered by broadband mobile services, there is an ongoing need to cover every square inch of an operator's coverage area with high bandwidth connectivity.

As the spectrum efficiency for the point-to-point link already approaches its theoretical limit, one way to increase the capacity of a network to simultaneously service more and more mobile stations is to split big cells into smaller and smaller cells. When the cell becomes closer to each other, the adjacent cell interferences become more severe, the cell splitting gain saturates. Furthermore, nowadays it is more and more difficult to acquire new sites to install base stations for the operators and the costs are also higher and higher. Therefore, cell-splitting cannot fulfill the bandwidth demands.

Improvements to the operation of cellular wireless networks are needed.

SUMMARY

This document describes technologies, among other things, for enabling improved co-existence of low power nodes and macro base stations in a heterogeneous network deployment.

In one aspect, methods, systems and apparatus are disclosed for transmitting a first Geometry Indicator signal over a first transmission range and in a first frequency band and transmitting data to user devices over a second transmission range and in a second frequency band.

In another aspect, methods, systems and apparatus are disclosed in which Geometry Indicator signals are used in a wireless cellular network comprising a macro node that provides wireless coverage to a cell and a plurality of low power nodes that operate at least partially within a coverage area of the macro node. A cellular identification is associated with each low power node. Each low power node is configured to transmit a Geometry Indicator signal, wherein a given Geometry Indicator signal provides information about proximity of a low power node that transmits the given Geometry Indicator signal In yet another aspect, a wireless communication system, comprising a macro transmission node and a first and a second low power nodes is disclosed. The low power nodes are configured to operate on a same frequency band with a same physical cell identifier and a different Geometry Indicators.

These and other aspects, and their implementations and variations are set forth in the drawings, the description and the claims.

BRIEF DESCRIPTION OF THE DRAWINGS

FIG. 4 depicts the allocation of REs to Geometry Indicator signal transmissions.

FIG. 5 is a flow chart representation of a process of facilitating operation of a low power network node.

FIG. 6 is a block diagram representation of a wireless network apparatus.

FIG. 7 is a flow chart representation of a process of wireless communications.

FIG. 8 is a block diagram representation of a wireless network apparatus.

Like reference symbols in the various drawings indicate like elements.

DETAILED DESCRIPTION

The techniques disclosed in this document, in one aspect, improve the operation of a heterogeneous network (HetNet) by facilitating controlling power of signal transmission from a user equipment (UE) by transmitting to the UE signals that allow the UE to estimate a geometry of deployment (e.g., how close a low power node is to the UE, compared to the macro cell base station).

In the present document, example embodiments using Long Term Evolution (LTE) deployment scenarios are discussed, but the scope of the disclosed techniques is not limited to LTE, and it can be used in other types of cellular HetNet communication systems. Furthermore, the terms used in this specification are generally consistent with their usage in the currently published versions of 3GPP documents TS 36.211 (version 11) and TS 36.212 (version 11), the relevant portions of which are incorporated in this document by references.

Recently, a new type of network deployment so-called HetNet (Heterogeneous Network) is proposed and attracts a lot of interests and efforts in the industry. In HetNet, another tier consisting of multiple low-power nodes, or micro base stations, is added onto the existing macro base stations coverage area. In some configurations, the macro base station works as a master and the low power nodes work as slaves (e.g., follow transmission schedule controlled by the master) in order to have better interference managements and resource allocation etc.

Figure 1:
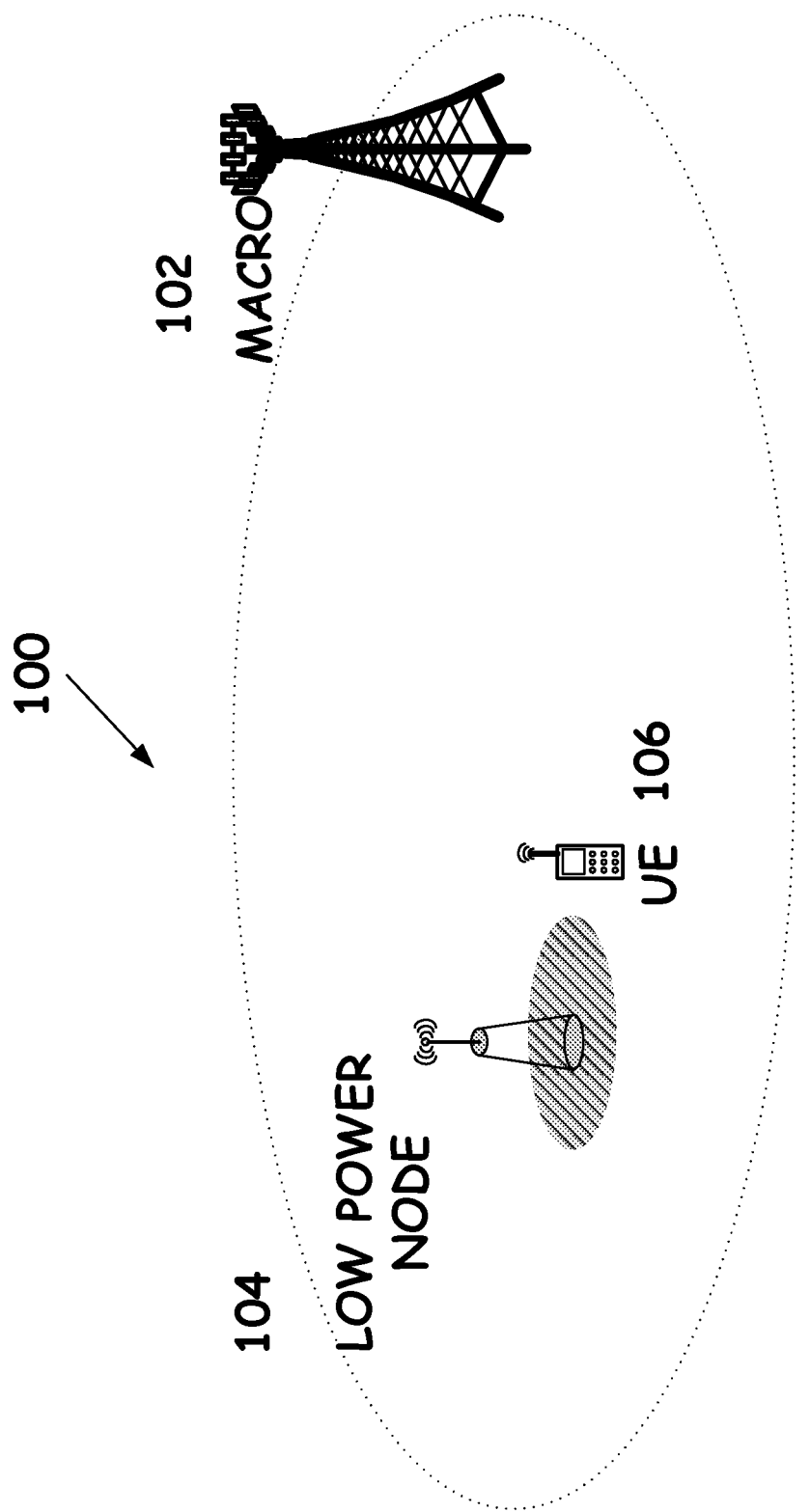
FIG. 1 depicts a wireless HetNet deployment scenario.

FIG. 1 shows an example HetNet deployment 100 that includes a macro base station 102, a low power node 104 and a UE 106. In some HetNet deployments, if a UE 106 is close to one low power node 104, the UE's uplink transmit power may be unnecessarily high before it establishes a connection with the network and lowers its transmit power by uplink power control loop. This unnecessary high transmit power generates the uplink co-channel interferences thus introduces certain detriments to the uplink capacity. This unnecessary high transmit power might reduce the performance or even block the receive chain completely at the low power node which it is close to.

In the present document, a geometry indicator is disclosed to help a UE 106 to find out its approach to one low power node to which it is close. The geometry indicator may be transmitted by the low power nodes, and the macro base station or by macro base station. The UE 106 typically (but not always) detects the geometry indicator at the same time when it performs synchronization to the network. In some embodiments, as a detection result, both the received synchronization channel from the macro station 102 and the received geometry indicator from low power nodes 104 are measured after the UE 106 is synchronized to the network. Thus the power difference can be measured between the geometry indicator and the synchronization channels. Then a path-loss difference is obtained by compensating the measured power difference with a broadcast parameter which shows the transmit power difference between the synchronization channel and the geometry indicator.

The path-loss difference can be used by the UE 106 afterwards, for example, to set the transmit power back-off when it starts to send PRACH (physical random access channel) preamble, or to set the transmit power back-off when it sends SRS (sounding reference signal) symbols, etc.

The path-loss difference measured by the UE 106 can also be reported to the macro base station 102 in different configurations. Examples of reporting include reporting actively, periodically or at the request from the macro base station. The macro base station 102 uses the reported path-loss difference as an auxiliary information to the scheduler, e.g., to determine which UE 106 should be served etc.

A wireless system operator may deploy macro nodes and low power nodes in a network by using a variety of different configurations. Some of the operational parameters that are customized for individual deployments include (1) whether or not both low power nodes and macro node transmit Geometry Indicator signals, (2) the range of data transmissions and Geometry Indicator signal transmissions, (3) the frequency band of the Geometry Indicator signal transmissions and data transmissions, (4) selection of the previously listed parameters to be same or different for all low power nodes deployed for operation in a macro node's coverage area.

Figure 9:
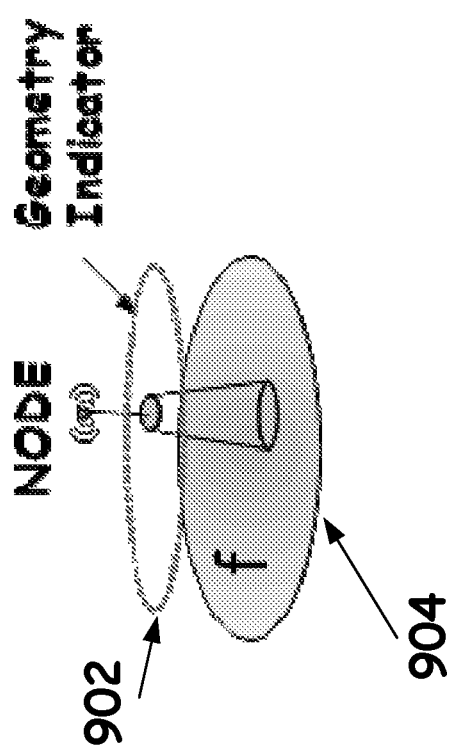
FIG. 9 depicts deployment of a Geometry Indicator transmission in a cellular network.

With reference to FIG. 9, in some embodiments, the GI is transmitted by a LPN on a frequency band with carrier frequency f. The GI transmission may have a certain coverage area 902, indicated by the dashed lines in FIG. 9. The shadowed area 904 in FIG. 9 depicts the coverage area for data transmission. The coverage area 902 of the GI can be larger, equal or smaller than the coverage area 904 for data transmission. The system operator may decide the relative sizes of coverage areas 902 and 904. These coverage areas may be changed during run-time to accommodate changes to the number of UEs in the system. For example, in some embodiments, the data coverage area 904 may be wider than the GI indicator coverage area 902 to facilitate seamless handoff of data traffic for UEs moving from one LPNs coverage area to another.

Figure 10:
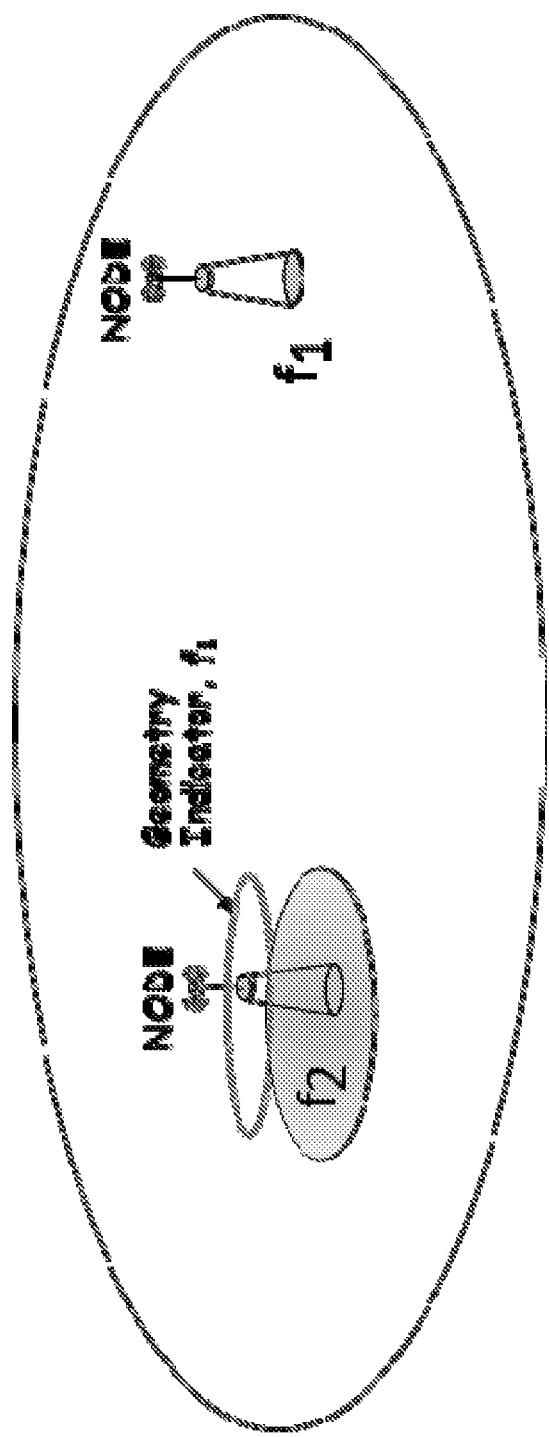
FIG. 10 depicts deployment of a Geometry Indicator transmission in a cellular network in which two frequency bands are used.

FIG. 10 depicts an embodiment in which all LPN signal and data transmission not related to the GI are transmitted on a frequency band with carrier $f_2$, but the GI transmitted on a carrier $f_1$ ($f_1 \neq f_2$). In this embodiment, a UE may be able to detect LPNs by receiving GI signals on the frequency band $f_1$. The data transmission of the overlaid macro is done on $f_1$. Thus, the LPN also transmits GI on the same frequency as the macro. In one advantageous aspect, a UE that is under macro coverage does not have to do inter frequency measurements in order to detect the presence of an LPN. Therefore, for locating a GI signal, thereby locating in LPN, it is enough to carry out search on $f_1$.

In some embodiments, signals and data transmission are carried out on multiple carriers $f_i$, and the GI is transmitted on $f_{GI}$ with ($f_{GI} \neq f_i$). The GI subcarrier ($f_{GI}$) may be known a priori to the UEs.

Figure 11:
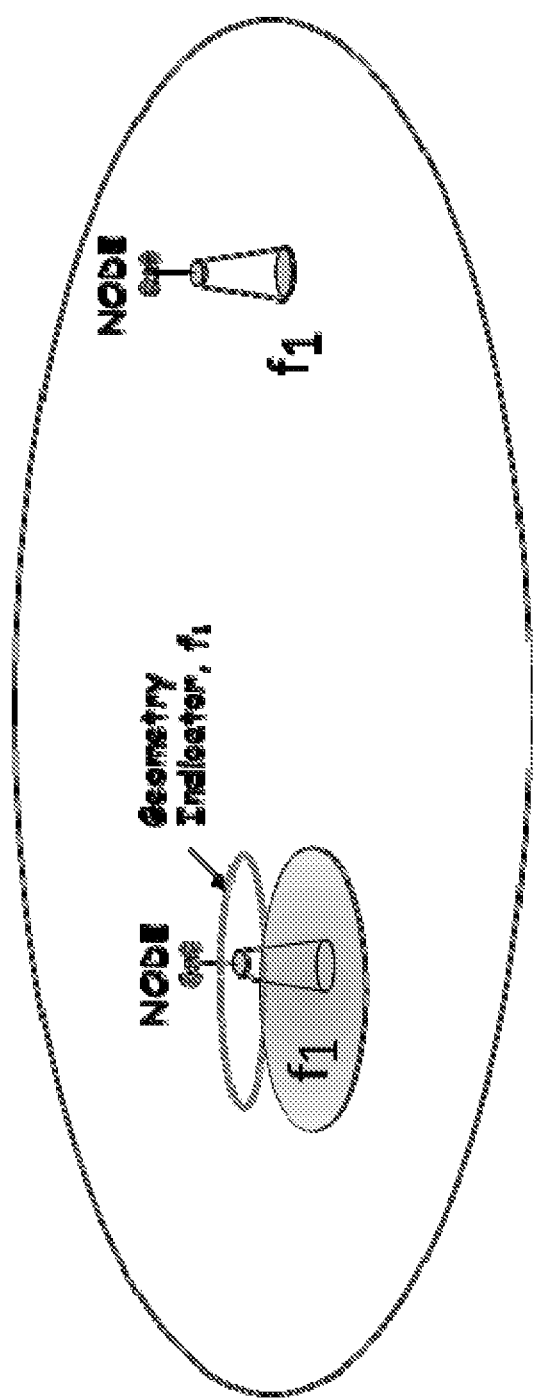
FIG. 11 depicts deployment of a Geometry Indicator transmission in a cellular network having multiple low power nodes using a same frequency band.

With reference to FIG. 11, all signals and data transmission not related to the GI are transmitted on a carrier $f_1$, and the GI is also transmitted on a carrier $f_1$. The previously described techniques for placing GI signals in previously unused REs may be utilized to carry the GI signals.

In some embodiments, signals and data transmission are carried out on multiple carriers $f_i$, and the geometry indicator is transmitted on multiple carriers $f_{GI,k}$. The carriers used for geometry indicator transmission can either be the same as for the other transmission or a sub-set of these carriers.

In some embodiments, there can be multiple different GI's used by the same LPN. In some embodiments, there can be multiple different LPNs.

Figure 12:
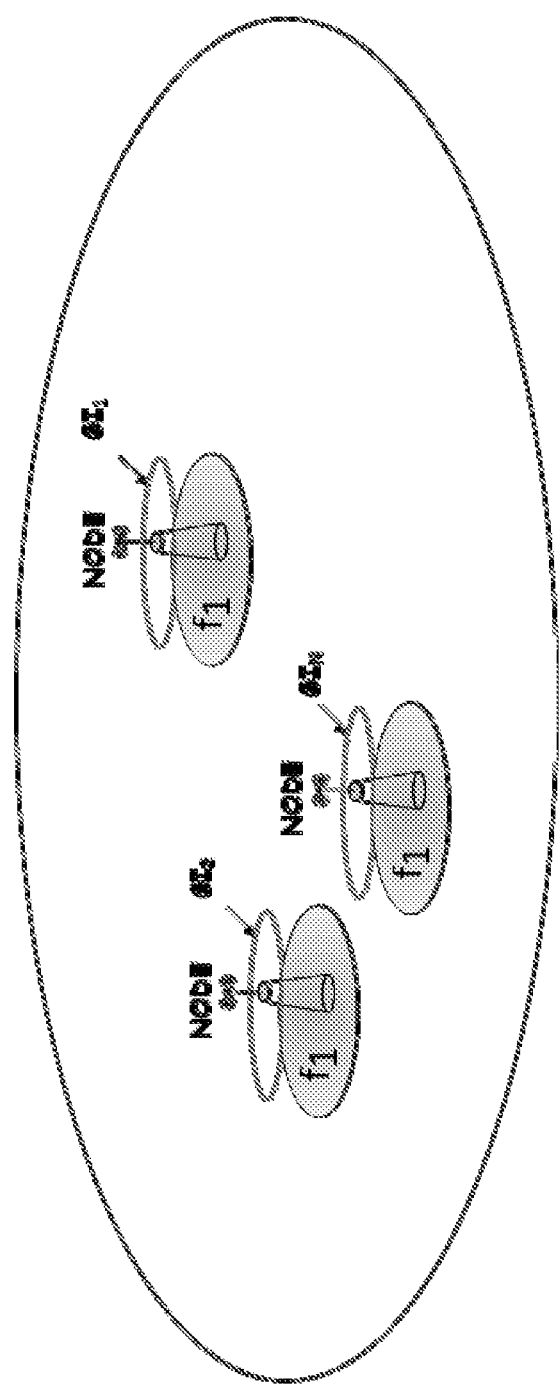
FIG. 12 depicts deployment of multiple Geometry Indicator transmissions in a cellular network having multiple Low Power Nodes.

FIG. 12 depicts an example embodiment in which a set of LPNs operates on a carrier $f_1$ with the same Physical Cell Identifier (PCI) but with different GI's. The Node creates a cell on $f_1$ together with one or more other nodes, and the Node transmits a GI which is different from one or more of the nodes with which the Node creates a cell. In some embodiments, the LPNs have different PCIs, i.e., create several cells. In such an embodiment, it may be possible to have a) one common GI that shows the existence of LPNs or b) different GI transmissions, where a cell ID already is indicated by the GI. The LPN ID could then either be encoded in the contents of the GI, or it could be identified by the physical position of the GI (e.g., which REs from all available previously unused REs are used for the specific GI transmission).

In some embodiments, the GI transmitted by a node may be determined, fully or partially, by the PCI of the node.

In some embodiments, the GI transmitted by a node is selected by using a mapping that maps a sub-set of the PCIs to a sub-set of the GIs. A node transmits a GI from a sub-set of GIs that a sub-set of PCIs, in which the PCI of the node is a member, is mapped to.

In some embodiments, a GI sub-set contains a single GI, so that PCIs in a PCI sub-set is mapped to a GI. In one realization, all GI sub-sets contain a single GI.

In some embodiments, the PCI sub-sets are disjoint. Alternatively, in some embodiments, the PCI-sub-sets are not disjoint. In some embodiments, some PCI sub-sets are disjoint while others are not disjoint.

In some embodiments, the GI transmitted by a low power node is determined, fully or partially, by the node listening on the air interface to the GIs transmitted by other low power nodes in the vicinity.

In some embodiments, the GI transmitted by a low power node is determined, fully or partially, by a policy received from an operations and maintenance function (OAM) in the network.

In some embodiments, the GI transmitted by a node is determined, fully or partially, by information the node receives from other nodes over a backhaul connection, for instance using the X2 protocol in LTE.

As described in greater detail below, in some embodiments, Geometry Indicator signals may be transmitted on the unused REs (e.g., as described in LTE). The mapping between different Geometry Indicators available unused RE may be performed in a variety of different ways. For example, the mapping may be a priori or a system run time selection. In some embodiments, Geometry Indicator signals may be transmitted simultaneously (concurrently) using unused REs and also normal REs (e.g., REs for which transmissions cane be scheduled by eNode B).

In some embodiments, one physical GI signal is transmitted on the available resources but its contents differs, e.g. different LPN IDs could be encoded and carried by the GI. The contents of a GI could span the unused REs in one OFDM symbol or also in several OFDM symbols. In other words, the duration of time over which the Geometry Indicator signal is transmitted in REs is not limited to the one OFDM symbol.

Another option is to distinguish different GIs by their locations on which REs they are transmitted. As further disclosed below in detail, the RE position, where the GI is transmitted could indicate the LPN ID.

A combination of the two above options could also be used.

In some embodiments, the Geometry Indicator signal is comprised the unused REs. The unused REs from several OFDM symbols together can build up the contents of one GI. In LTE, for example, all sub-frames that have PSS/SSS (Primary Synchronization Signal/Secondary Synchronization Signal) also have unused REs. The length of one GI is not restricted to the available unused REs during one of these sub-frames.

In some embodiments, a realization of the GI as one sequence as described in this document may be accomplished.

In some embodiments, a realization of multiple GIs from a set of sequences may be performed. Some example sequences are further described below.

In some embodiments, a realization of the one or multiple GIs through encoding the LPN ID as described in this document is performed.

In some embodiments, different LPNs have the same cell ID, and all transmitting the same GI.

In some embodiments different LPNs, have the same cell ID and transmit different Geometry Indicator signals which could indicate the LPN ID. The LPN ID could then be encoded according to methods described below in greater detail.

In some embodiments different LPNs have different cell ID. But these LPs may use same Geometry Indicator signal. This could indicate to the UE that there is an LPN cluster around.

In some embodiments, different LPNs may use different cell ID and different Geometry Indicator signals.

In some embodiments, a combination of the above may be used. For example, some LPNs may send the same Geometry Indicator and others may send a different Geometry Indicator.

In some embodiments, the position of the Geometry Indicator signal within the REs of a given sub-frame (i.e. which of the unused REs are selected to transmit the GI) is used to distinguish between different GIs, e.g. to identify different LPNs.

In some embodiments, the Geometry Indicator signal could be transmitted on the 'Unused black REs' (e.g., as described in 3GPP LTE R8 to R11) besides the below-described PSS and SSS, or transmitted on both the 'Unused black REs' beside PSS and SSS and other normal REs if the 'Unused black REs' are not sufficient.

Figure 2:
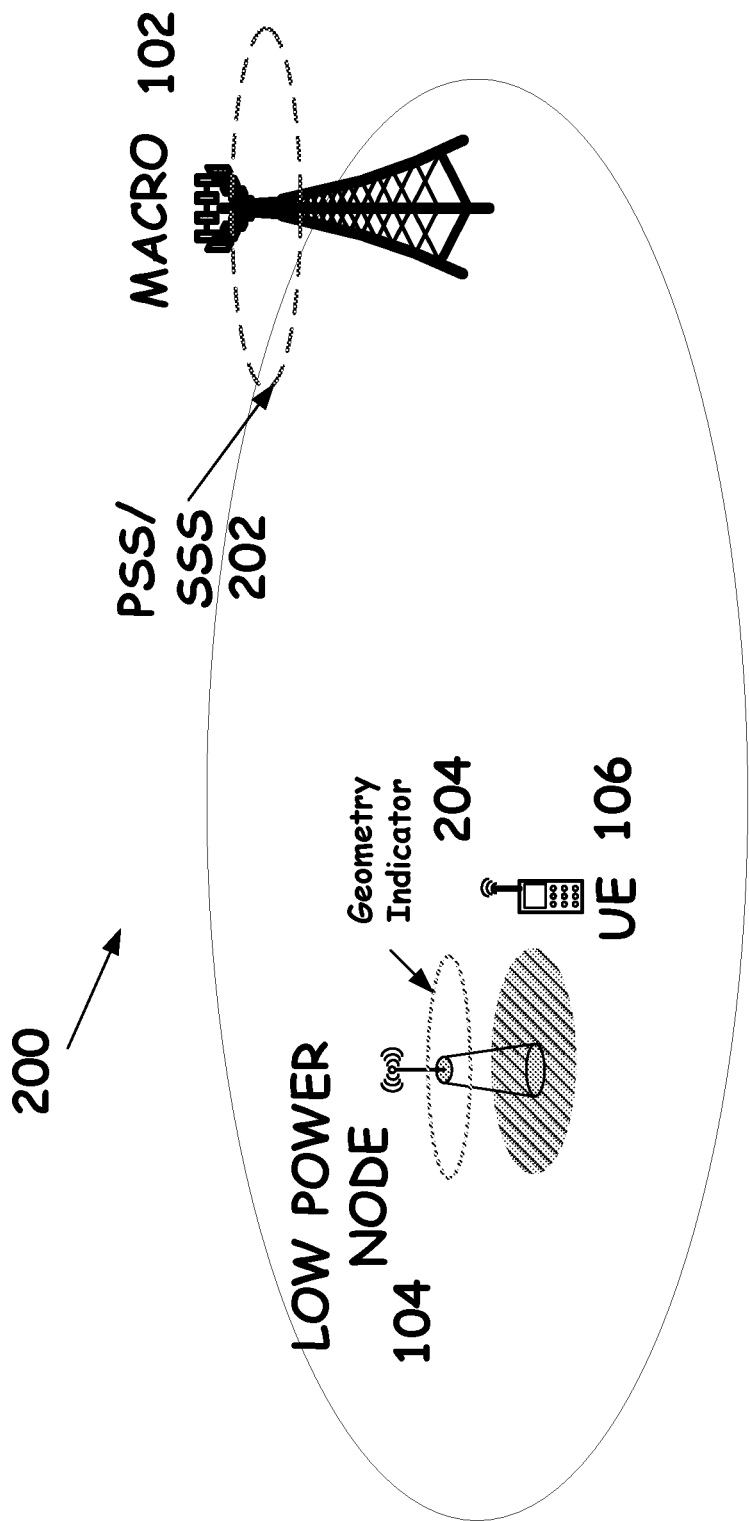
FIG. 2 depicts a wireless HetNet deployment that uses a geometry indicator.

With reference to FIG. 2, one example operation of a HetNet 200 that uses a geometry indicator is disclosed.

(1) Primary synchronization signal and secondary synchronization signal 202 is transmitted only by the macro base station 106 as normally, but not in the low power nodes 104. For example, in LTE networks, PSS/SSS 202 is located at slot 0 and slot 10 respectively in one radio frame;

(2) Geometry Indicator 204 is only transmitted by the low power nodes 104:

One embodiment example is as follows:

Sequence

1) Only one sequence indicating the geometry indicator for all LPNs 104. And the geometry indicator could be a predefined 32-bit sequence. For example, one of the control frame indicator (CFI) sequences can be reused as the geometry indicator, for example, the first CFI sequence:

$$<0,1,1,0,1,1,0,1,1,0,1,1,0,1,1,0,1,1,0,1,1,0,1,1,0,1,1,0,1,1,0,1> \quad \text{Eq. (1)}$$

2) There are several predefined sequences and each sequence corresponds to the LPN ID or group ID. For example, all of the CFI sequences can be reused as the geometry indicator.

Time-Frequency Plane Location

In LTE, in one radio frame (10 ms), there are 20 Resource Elements (REs) unused at the same orthogonal frequency domain multiplexing (OFDM) symbols as PSS and SSS 202 located. Therefore 16 REs of them is used for the geometry indicator 204. And in order to have less impact on the synchronization channels, the rest 4 REs are used to separate geometry indicator and the synchronization channels. This arrangement is depicted in FIG. 3A.

Figure 3A:
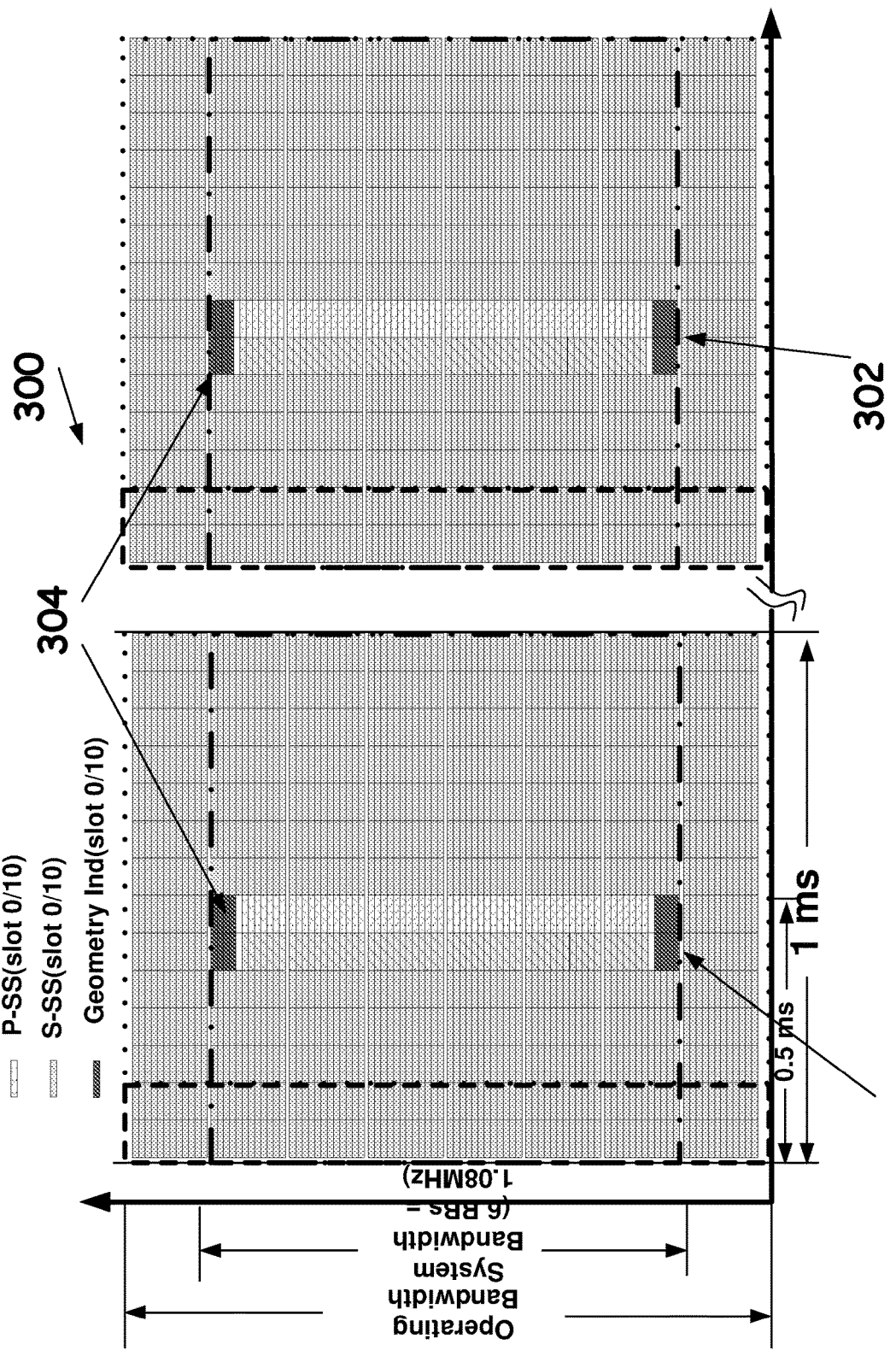
FIG. 3A depicts a transmission resource allocation graph in which certain resource elements (REs) are assigned to transmission of a Geometry Indicator (GI) signal.

With reference to FIG. 3A, REs are plotted along time axis (horizontal) and frequency axis (vertical) with RE group 302 and 304 showing the unused subcarriers in OFDM symbols used by primary and secondary synchronization signals.

In conventional wireless systems, a synchronization signal (SS) is transmitted in an OFDM symbol on a set of subcarriers. However, often, the SS does not span exactly an integer multiple of $N_{sc}^{RB}$ subcarriers, where $N_{sc}^{RB}$ is the number of subcarriers per RB (resource block). Hence, there is typically a set of unused subcarriers in the multiple of $N_{sc}^{RB}$ subcarriers in which the SS is transmitted. These unused subcarriers (frequency) together with the OFDM symbol in which an SS is transmitted (time) define the time-frequency locations of unused REs.

In the LTE standard 3GPP Rel 11, and also for earlier releases, 72 REs are reserved for the SS. These REs span 72 consecutive subcarriers in frequency (in 6 PRBs) and a single OFDM symbol in time. These REs contain 62 REs carrying a synchronization signal (primary of secondary). The unused REs are the 10 remaining REs that are not occupied by the SS. The DC subcarrier is not included in the 72 subcarriers in the six center RBs. In the current version of the standard, they are located 5 subcarriers above and below the SS. In some embodiments, an SS may be a legacy LTE PSS. In some embodiments, an SS may be a legacy LTE SSS. This arrangement is depicted in FIG. 3A.

In general, if 6 PRBs (72 subcarriers) are reserved for the SS, the unused REs do not need to be consecutive in frequency, but any RE out of the set of the 72 possible REs could become an unused RE as long as it is not occupied by an SS. Some embodiments may use a different number of PRBs (e. g., 2 or 8 PRBs). In some embodiments, an integer multiple "k" of $N_{sc}^{RB}$ subcarriers can be reserved for the SS and then unused REs are those out of the k*$N_{sc}^{RB}$ subcarriers which are not occupied by the SS. In some embodiments, multiple synchronization signals may be used, each having its own "k" value, which may be the same or different from that of other SSs. For example, a first SS may use k1*$N_{sc}^{RB}$ subcarriers, a second SS may be k2*$N_{sc}^{RB}$ subcarriers, and so on.

In the general case, embodiments may not use 2 synchronization signals. For example, PSS+SSS in the legacy case come after each other on consecutive OFDM symbols, but such may not be the case for future systems. The unused REs can be defined to be in REs adjacent to a single SS (in frequency) which could be PSS, SSS or another synchronization signal.

In another embodiment, an SS is a legacy LTE PSS or a legacy LTE SSS that has been moved in frequency, compared to the legacy six center RBs. By moving an SS from the six center RBs to new RBs, the relative position between the DC subcarrier and the SS will be changed. In one embodiment, some properties, e.g. spectral properties, of the moved SS can be maintained by assigning a subcarrier in the new RBs to act as a dummy DC subcarrier. This could mean that an SS is mapped to subcarriers around the dummy DC subcarrier. In one embodiment, the RE defined by a dummy DC subcarrier on the OFDM symbol of an SS is included in the unused REs. Hence, a GI maybe transmitted on the dummy DC subcarrier. Alternatively, in some embodiments the unused RE corresponding to the DC subcarrier may not be used for GI transmissions.

Figure 3B:
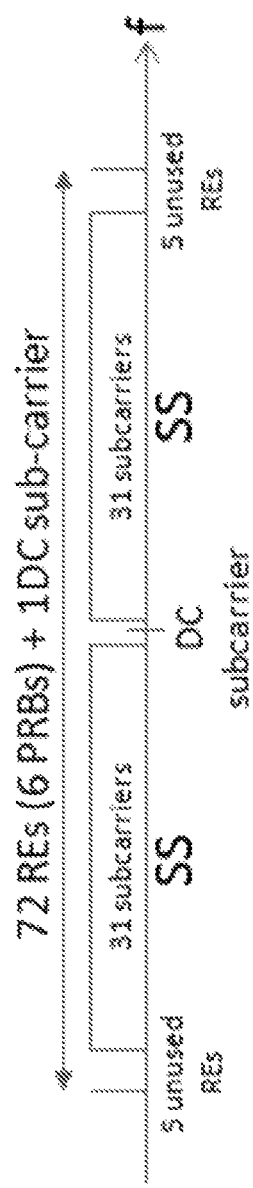
FIG. 3B depicts an example spectral occupancy of a synchronization signal (SS).
Figure 3C:
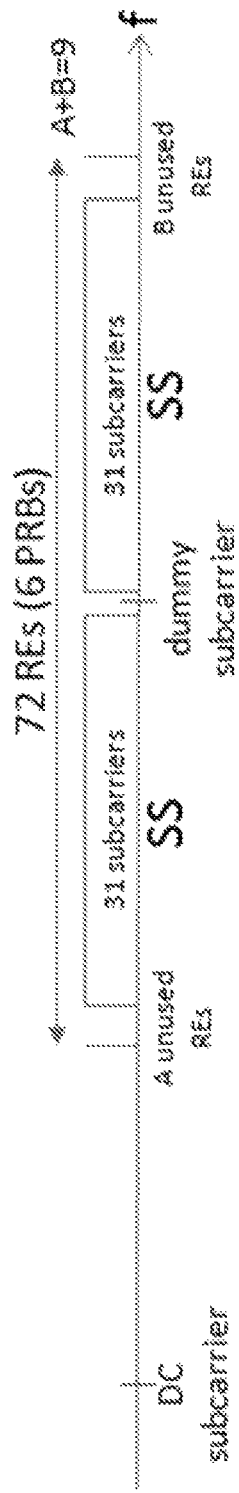
FIG. 3C depicts another example spectral occupancy of a synchronization signal.
Figure 3D:
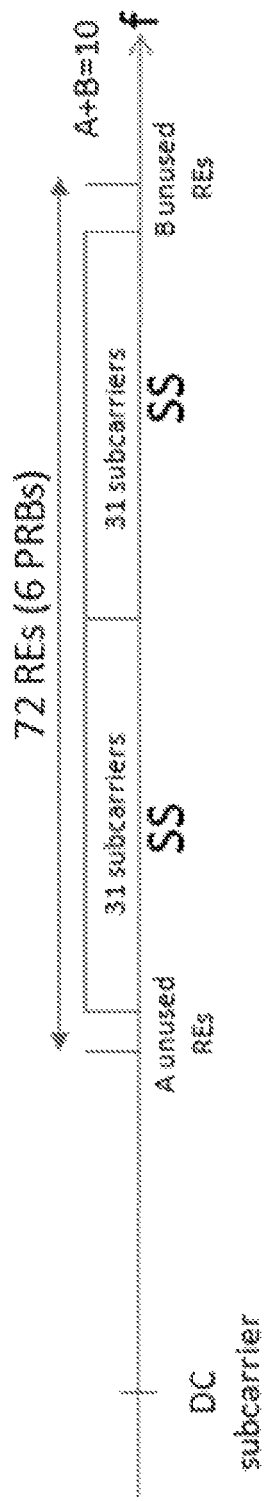
FIG. 3D depicts another example spectral occupancy of a synchronization signal.

FIGS. 3B, 3C and 3D illustrate the above described embodiments.

In a legacy embodiment, the SS is mapped onto the first 31 sub-carriers on each side of the DC. This is illustrated in FIG. 3B. As the DC subcarrier typically contains no information, in LTE, this corresponds to mapping onto the middle 62 subcarriers within an OFDM symbol in a resource grid.

In future releases, the SS could be shifted in the frequency domain. The SS could then be centered around a dummy DC subcarrier instead of the DC sub-carrier in R11. One of the unused sub-carriers can be used as the dummy sub-carrier. This as it is illustrated FIG. 3C. In total 10 unused sub-carriers are available in that example; one is used for the dummy subcarrier and A subcarriers are located next to the lowest subcarrier of SS and B subcarriers are located next to the highest frequency of the SS, where A+B=9 in this example.

In another embodiment (FIG. 3D) the SS is frequency shifted, but a dummy DC subcarrier is omitted. The SS is mapped onto 62 consecutive sub-carriers as shown in FIG. 3D. In total 10 unused sub-carriers are available in that example; A subcarriers are located next to the lowest subcarrier of SS and B subcarriers are located next to the highest frequency of the SS, where A+B=10 in this example.

Legacy LTE PSS or SSS are transmitted in certain OFDM symbols within a legacy LTE frame structure. In one embodiment, an SS is a PSS or an SSS transmitted in another OFDM symbol than in the legacy LTE frame structure.

Geometry indicator transmissions can occupy positions of unused REs when the legacy SS gets modified (e.g. SS is a legacy LTE SSS with a new scrambling sequence), or when multiple synchronization signals are used. The size of the SS is not be limited to 62 REs either. REs left over from what are used for the synchronization signals (either one or several), can be used for the transmission of Geometry Indicator.

FIG. 4 shows an enlarged view of RE groups 302 and 304. REs 402 correspond to the REs usable by geometry indicator signals. REs 404 are used by PSS and REs 406 are used by SSS. REs 408 can be optionally used to provide separation between PSS/SSS and geometry signal transmissions. In one beneficial aspect, REs 408 help mitigate any backward compatibility issue with UEs that are expecting no energy transmission in the REs 402.

Modulation

The 32-bit sequence is QPSK modulated to be carried on the 16 REs.

Another embodiment example is:

The geometry factor carries L bits LPN ID. The L-bit LPN ID is at first encoded into M bits, then M bits are modulated into Q symbols, and the Q symbols are finally mapped to Q physical REs whose relative positions to PSS/SSS are fixed and known by UEs.

(3) UE performs the synchronization as normally (4) When UE obtains the synchronization to the found cell, it detects/decodes the geometry indicator at the same OFDM symbols as the found synchronization channels.

(5) UE measures the power difference $\Delta P_{SG}=P_{rx\_GI}-P_{rx\_Synch}$ between the synchronization channels and the geometry indicator.

(6) UE reads MIB and other SIBs to get the transmit power difference between the synchronization channels and geometry indicator $T_{SG}=P_{Synch}-P_{GI}$ (7) UE calculates the path-loss difference $\Delta PL_{ml}=PL_{macro}-PL_{LPN}$ as:

$$\Delta PL_{ml} = (P_{Synch} - P_{rx\_Synch}) - (P_{GI} - P_{rx\_GI}) \qquad \text{Eq. (2)}$$
$$= (P_{Synch} - P_{GI}) + (P_{rx\_GI} - P_{rx\_Synch})$$
$$= T_{SG} + \Delta P_{SG}$$

(8) The path-loss difference $\Delta PL_{ml}$ is used for lower the initial preamble transmit power and SRS symbol transmit power etc.

(9) The measured path-loss difference can be sent to the network actively, periodically or at the request by the network. For example, the path-loss difference can be an auxiliary input to the network for locating the UE.

(10) UE can also report the decoded LPN ID to the network actively, periodically or at the request by the network. For example, the LPN ID can be an auxiliary input to the network for locating the UE.

In some implementations, multiple LPNs may coordinate with each other to form a group that is represented by a group ID. These LPNs may coordinate to transmit an identical geometry indicator signal in the REs 402 using the shared group ID for identification. The power of geometry indicator signal may be adjusted downwards so that the additive effect of transmissions from all LPNs at the UE does not exceed a pre-determined threshold.

In a typical deployment scenario, the LPNs may be deployed to facilitate the operation of a UE in a range between 1 meter to 40 meters. In typical deployment scenarios, based on the path characteristics, UE operation may result in a 20 dB to 6 dB backoff in power from the peak random access preamble transmission power.

FIG. 5 is a flow chart representation of a process 500 for operating a wireless device in a wireless network. At 502, a first power level of a first signal received from a first node is estimated. For example, in some embodiments, the first signal may include synchronization signals, such as the above-discussed primary and secondary synchronization signals. At 504, a second power level of a second signal received from a second node is estimated. The second signal may correspond to, for example, geometry indicator signal transmitted by an LPN. At 506, a path loss difference value is calculated using the first power level estimate and the second power level estimate. The path loss difference value may be calculated, e.g., as discussed with respect to Eq. (2). At 508, using the path loss difference value, a third power level of an initial preamble signal transmission to the first node is adjusted. As previously discussed the adjustment could typically in the 6 dB to 30 dB range. For example, as discussed above, the path loss difference value is used to lower the initial preamble transmit power. Optionally, the path-loss difference value may be communicated to the first node on a periodic or on-demand basis.

FIG. 6 is a block diagram representation of an apparatus 600 operable in a heterogeneous wireless network. The module 602 is for estimating a first power level of a first signal received from a first node. The module 604 is for estimating a second power level of a second signal received from a second node. The module 606 is for calculating a path loss difference value using the first power level estimate and the second power level estimate. The module 608 is for adjusting, using the path loss difference value, a third power level of an initial preamble signal transmission to the first node. The apparatus 600 and modules 602, 604, 606 and 608 may further be configured to implement one or more of the disclosed techniques.

FIG. 7 is a flow chart representation of a process 700 of wireless communications for implementation in a heterogeneous network that includes at least one macro node configured to transmit a synchronization signal in a pre-defined set of time-frequency transmission resources. At 702, no transmission of signals at time-frequency transmission resources non-overlapping with the pre-defined set of time-frequency resources is performed. In other words, operation of a node is controlled such that no RF energy is radiated at these resources. For example, as discussed above, an LPN may be operated to refrain from transmitting PSS/SSS signals. At 704, a geometry indicator signal is transmitted at time-frequency transmission resources non-overlapping with the pre-defined set of time-frequency resources. As disclosed with respect to FIGS. 3 and 4, the REs used for geometry indicator signal transmissions may occupy the same OFDM symbols as PSS/SSS. There may be a separation (i.e., REs on which no signals are transmitted) to facilitate backward compatibility. The geometry indicator signal is transmitted at a power level lower than that of the synchronization signal. The geometry indicator signal carries a transmitting node identification.

FIG. 8 is a block diagram representation of a portion of a wireless communication apparatus for operation in a heterogeneous network that includes at least one macro node configured to transmit a synchronization signal in a pre-defined set of time-frequency transmission resources. The module 802 is for refraining from transmitting signals using the pre-defined set of time-frequency transmission resource. The module 804 is for estimating a second power level of a second signal received from a second node. A path loss difference value is calculated using the first power level estimate and the second power level estimate. Using the path loss difference value, a third power level of an initial preamble signal transmission to the first node is adjusted. The apparatus 800 and modules 802, 804, may further be configured to implement one or more of the disclosed techniques.

In some embodiments, certain existing signals may be modified to enhance performance for small cell operations. Existing signals could for instance be a PSS extended with a Geometry Indicator signal. In some embodiments, GI also can be used together with other signals (e.g., system signals such as reference signals and synchronization signals) to enhance the small cell discovery. In some embodiments the GI may be used stand-alone.

In some embodiments, when a UE detects a GI signal, due to the detection of GI signals, additional mechanisms, such as interference cancellation on legacy signals are assisted (e.g. triggered or triggered and used also after the triggering).

In some embodiments, due to the detection of the GI, measurements, such as inter-frequency measurements to find small cells on other carrier frequencies than the one on which the GI is transmitted, intra-frequency measurements, CSI-RS or modified CSI-RS measurements, PRS or modified PRS measurements, are assisted (e.g. triggered or also triggered and used after the triggering).

In some embodiments, due to the detection of the GI, the configuration of the New Carrier Type (NCT) is changed. In NCT schemes, a flexible, re-configurable transmission of channels and signals is possible. In some embodiments, upon detection of a GI, the configuration of the NCT is changed. For example, the transmission of certain signals and/or channels is activated, deactivated or their transmission pattern is reconfigured to facilitate small cell operation.

In some embodiments, due to the detection of a GI, the DTX pattern of certain channels and/or signals is changed.

In some embodiments, a UE uses one or multiple detected GIs to facilitate cell detection and/or measurements. The cell detection is used to assist interference cancellation on other signals, such as legacy LTE signals or new signals not yet standardized.

In some embodiments, a UE uis able to receive/process one or multiple GIs so that their detection can be used to turn on small cells operation.

In some embodiments, a UE uses one or multiple detected GIs together with other signals (e.g. legacy PSS/SSS, CRS or CSI-RS or new signals not yet standardized) so that the previously described functions can be carried out (e.g. small cell detection, measurements, changes in NCT configuration or DTX pattern, interference cancellation). Depending on the type of function, it can either be performed by the UE (e.g. power measurements, cell detection) or the UE can assist the network by performing the function (e.g. small cell on/off or change of NCT configuration).

In some embodiments, a UE uses one or multiple detected GIs to facilitate cell detection. The cell detection is used to assist interference cancellation on other signals, such as legacy LTE signals or new signals not yet standardized.

In some embodiments, a modified legacy signal is used so that the various functions described in this document can be carried out.

In some embodiments, a modified signal may be obtained through extension of the legacy PSS/SSS synchronization signals. In some embodiments, the GI is added to the legacy signals, e.g., the GI is transmitted in the unused REs and the legacy PSS/SSS transmitted unchanged, as transmitted in a legacy network.

Upon the detection of the modified synchronization signal or a portion of the modified synchronization signal, the previously mentioned functions, e.g. small cell detection, measurements, changes in NCT configuration or DTX pattern, interference cancellation, etc. can be carried out. A legacy UE can use the legacy PSS/SSS part within the modified signal and a new UE (e.g., a Revision 12 UE, as defined in the Third Generation Partnership Project 3GPP) can use either the GI part, the legacy part or both parts together.

In some embodiments, a legacy synchronization signal is modified through an extension (time domain or frequency domain) of the synchronization signal. For example, for frequency domain extension, as previously disclosed in this document, the GI is added to the legacy PSS/SSS and transmitted in the unused REs. In some embodiments, the legacy synchronization signals themselves may be muted when transmitting certain transmission frames. Thus, effectively, only the GI is transmitted in these transmission periods.

Upon the detection of the GI, previously mentioned functions can be carried out, e.g. small cell detection, measurements, changes in NCT configuration or DTX pattern, interference cancellation.

In some embodiments, a UE uses a mapping from detected a GI to PCI sub-set, as disclosed in this document, to assist cell detection and/or measurement, and/or interference cancellation.

It will be appreciated that the present document discloses techniques that make it possible to introduce a new physical discovery signal that does not affect the legacy UEs and at the same time introduce zero overhead. In some embodiments, this is achieved by using the unused REs that are surrounding the PSS/SSS RE's. It would be advantageous when introducing a new physical signal to not have any impact on legacy UEs and that the overhead (occupation of PDSCH REs), as achieved by some embodiments disclosed in the present document. An example of unused REs is depicted in the previously disclosed in FIG. 3A.

One reason that the REs are left unused is to ease the UE receiver implementation, e.g., lower sampling rate of the antenna data and using a 64-point FFT. The present document provides unused REs for the new physical discovery signal. Some disclosed embodiments achieve this by using a 128-point FFT and a corresponding sampling rate of 1.92 MHz of the antenna data.

Figure 13:
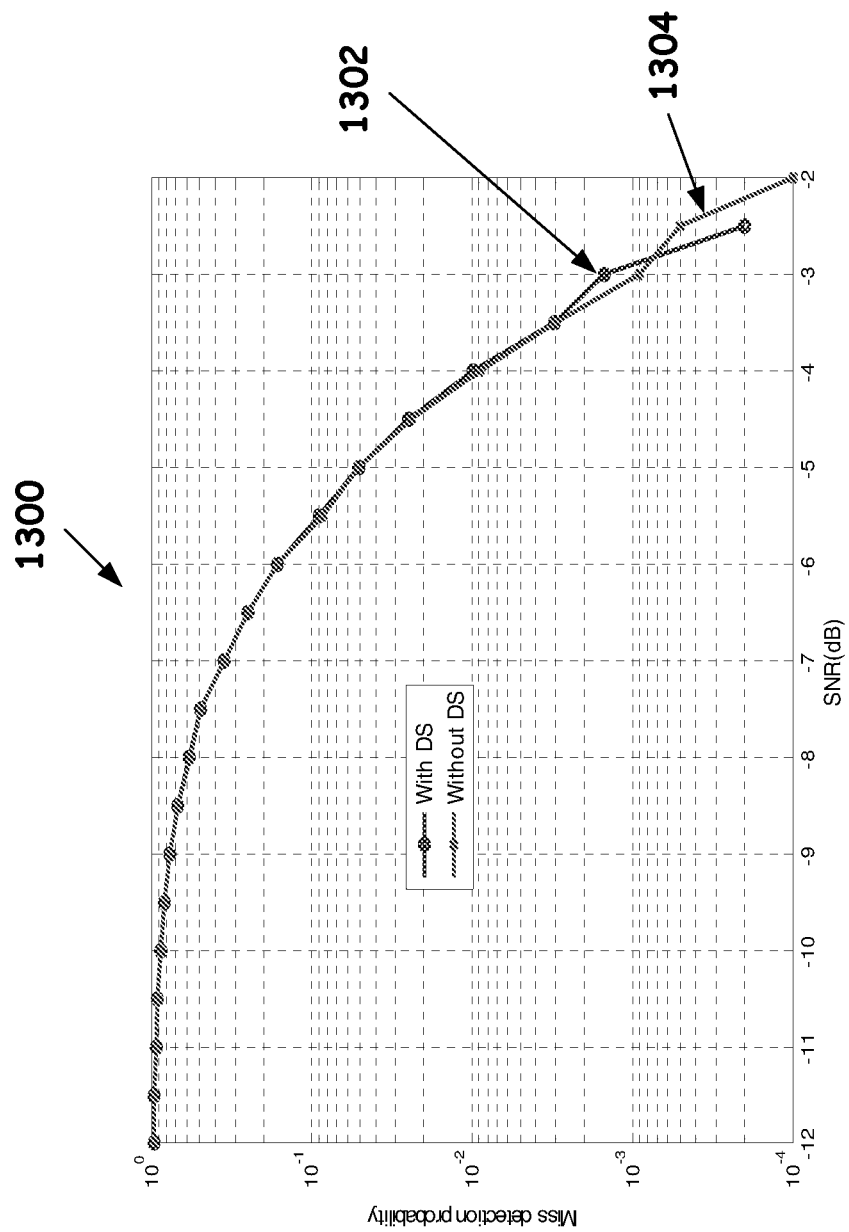
FIG. 13 depicts Link level performance of cell search when the unused REs transmit or not.

To ascertain the performance of the disclose techniques, the inventors performed both link level and system-level simulations. One purpose of the simulations was to verify that with the same receiver/detector there is no impact from the transmission of the unused REs, both from link level and system level. The probability of missed detection in the cases when the new physical discover signal is transmitted (termed as "with DS" 1302) and when it is not transmitted (termed as "without DS" 1304) as a function of SNR are depicted in graph 1300 of FIG. 13. This is done under AWGN conditions using 1RX/1TX antenna. The result is shown in FIG. 13.

Figure 14:
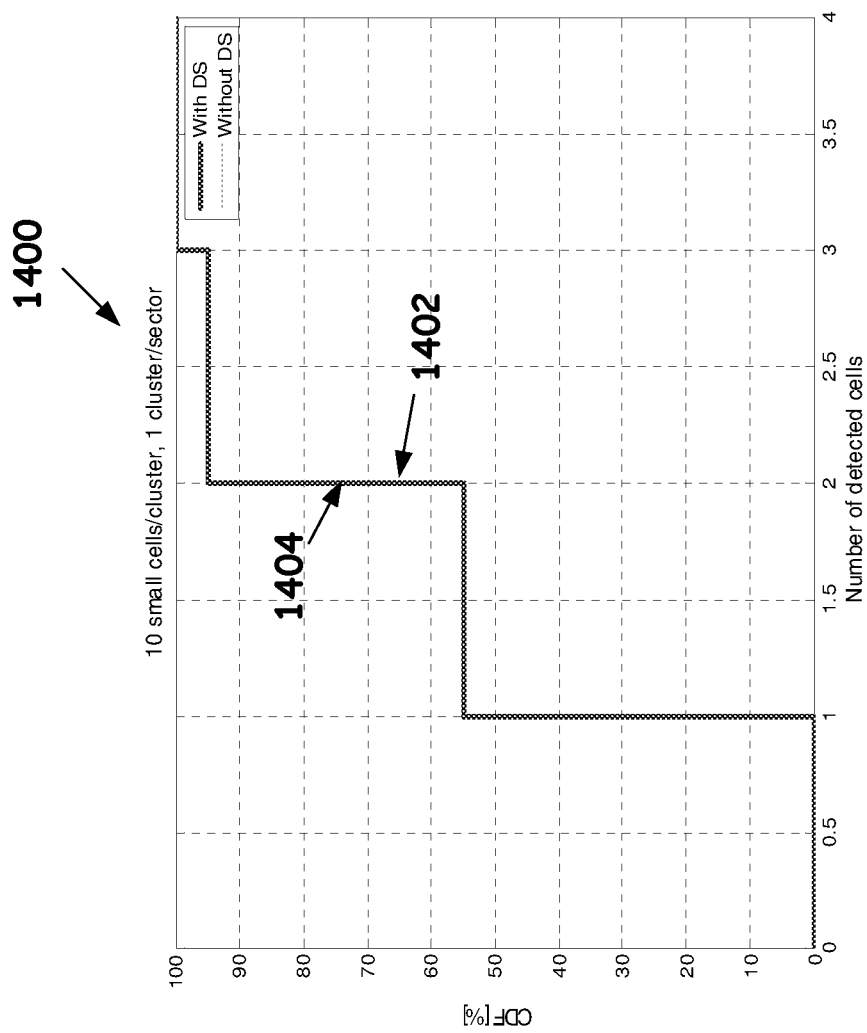
FIG. 14 System level performance of cell search when the unused REs transmit or not.

In FIG. 14, an example graph 1400 of results obtained from a system level simulation are presented, it can be seen that there are no impact on the legacy UEs when transmitting the new physical discovery signal on the unused REs (1402 with DS and 1404 without DS).

It will be appreciated that introducing a new physical discovery signal, as is disclosed in the present document, on the unused REs can have the following benefits:

Zero overhead is introduced with the new physical discovery signal

New transmissions can co-exists with legacy UEs

Reduced requirement of the decimation filters for the cell search implementation For example, in some embodiments, only a 128-point FFT may be used instead of possible 2048-point if the DS would be mapped to other REs (not PSS/SSS). This can reduce the power consumption of the UE in the process of discovering small cells.

Furthermore, as disclosed in FIG. 3A, there can be a total 40 Unused REs in one radio frame. In order to be resistant to the initial frequency offset up to ±7.5 kHz for the PSS stage DS on the RE closest to the PSS/SSS REs may be left unallocated. With this, there are 32 Unused REs that can be used for the new physical discovery signal Table 1 below lists parameters used in link level simulation results presented in FIG. 13 and FIG. 14.

TABLE 1

| Items | Values |
|---|---|
| Channel Condition | AWGN |
| Antenna Configuration | 1 TX 1RX |
| Bandwidth After Decimation | 0.96 MHz |
| PSS/SSS Non-coherent Accumulation | No |
| Constant False Alarm Rate | 0.1% for both PSS and SSS |
| Frequency Offset | 0 Hz |

Table 2 shows System level simulation setup. The first column shows the list of items.

TABLE 2

| Items | Macro cell | Small cell |
|---|---|---|
| Layout | ISD: 500 m, 7 Macro sites, with wrap-round | Clusters uniformly dropped within the macro geographical area; small cells uniformly dropped within each small cell cluster area |
| System bandwidth | | |
| Carrier frequency | | |
| Total BS TX power (Ptotal per carrier) | | |
| Distance-dependent path loss | ITU UMa[referring toTable B.1.2.1-1 in TR36.814], with 3D distance between an eNB and a UE applied | ITU Umi [referring toTable B.1.2.1-1 in TR36.814] with 3D distance between an eNB and a UE applied |

TABLE 2-continued

| Items | Macro cell | Small cell |
|---|---|---|
| Penetration | For outdoor UEs: 0 dB For indoor UEs: 20 dB + 0.5 din | For outdoor UEs: 0 dB For indoor UEs: 20 dB + 0.5 din |
| Shadowing | ITU UMa according to Table A.1-1 of 36.819 | ITU UMi[referring toTable B.1.2.1-1 in TR36.814] |
| Antenna pattern | 3D, referring to TR36.819 | 2D Omni-directional |
| Antenna Height: | 25 m | 10 m |
| Antenna gain + connector loss | 17 dBi | 5 dBi |
| UE Antenna Height: | | 1.5 m |
| Antenna gain of UE | | 0 dBi |
| UE speed | | 3 km/h |
| Antenna configuration | | |
| Number of clusters per macro cell geographical area | | 1 |
| Number of small cells per Macro cell | 4 small cells/Macro sector | |
| Number of UEs UE dropping | 30 UEs/Macro cell area | |
| Radius for small cell dropping in a cluster | 50 m | |
| Radius for UE dropping in a cluster | 70 m | |
| Minimum distance (2D distance) | Small cell-small cell: 20 m Small cell-UE: 5 m Macro - small cell cluster center: 105 m Macro - UE: 35 m cluster center-cluster center: 2x Radius for small cell dropping in a cluster | |

Some aspects of the discussed subject technology is highlighted below, written with clause enumeration for ease of readability.

Clause 1. A method of operating a wireless device in a wireless network, comprising: estimating a first power level of a first signal received from a first node; estimating a second power level of a second signal received from a second node; calculating a path loss difference value using the first power level estimate and the second power level estimate; and adjusting, using the path loss difference value, a third power level of an initial preamble signal transmission to the first node.

Clause 2. The method of clause 1, wherein the first node comprises a macro area node and the first signal comprises a synchronization signal; and the second node comprises a micro area node and the second signal comprises a geometry indicator signal.

Clause 3. The method of clause 2, wherein the synchronization signal uses a first set of time-frequency resources and the geometry indicator signal uses a second set of time frequency resources not used by the first node.

Clause 4. The method of clause 3, wherein the second set of time-frequency resources fit within the same orthogonal frequency domain multiplexing (OFDM) symbols as the first set of time-frequency resources.

Clause 5. The method of clause 1, further comprising transmitting, to the first node, a report comprising the path loss difference value.

Clause 6. The method of clause 1, further comprising decoding the second signal to recover an identity of the second node.

Clause 7. The method of clause 1, further comprising adjusting, using the path loss difference value, a fourth power level of a sounding reference signal transmission to the first node.

Clause 8. A wireless device operable in a heterogeneous wireless network, comprising: a first power level estimator that estimates a first power level of a first signal received from a first node; a second power level estimator that estimates a second power level of a second signal received from a second node; a path loss difference calculator that calculates a path loss difference value using the first power level estimate and the second power level estimate; and a transmit power adjuster that adjusts, using the path loss difference value, a third power level of an initial preamble signal transmission to the first node.

Clause 9. The device of clause 8, wherein the first node comprises a macro area node and the first signal comprises a synchronization signal; and the second node comprises a micro area node and the second signal comprises a geometry indicator signal.

Clause 10. The device of clause 9, wherein the synchronization signal uses a first set of time-frequency resources and the geometry indicator signal uses a second set of time frequency resources not used by the first node.

Clause 11. The device of clause 10, wherein the second set of time-frequency resources fit within the same orthogonal frequency domain multiplexing (OFDM) symbols as the first set of time-frequency resources.

Clause 12. The device of clause 8, further comprising transmitting, to the first node, a report comprising the path loss difference value.

Clause 13. The device of clause 8, further comprising decoding the second signal to recover an identity of the second node.

Clause 14. The device of clause 8, further comprising adjusting, using the path loss difference value, a fourth power level of a sounding reference signal transmission to the first node.

Clause 15. A processor-readable medium having processor-executable instructions stored thereon, the instructions, when executed, causing a processor to implement a wireless communications method, comprising: estimating a first power level of a first signal received from a first node; estimating a second power level of a second signal received from a second node; calculating a path loss difference value using the first power level estimate and the second power level estimate; and adjusting, using the path loss difference value, a third power level of an initial preamble signal transmission to the first node.

Clause 16. A method of wireless communications for implementation in a heterogeneous network that includes at least one macro node configured to transmit a synchronization signal in a pre-defined set of time-frequency transmission resources, the method comprising: refraining from transmitting signals using the pre-defined set of time-frequency transmission resource; and transmitting a geometry indicator signal at time-frequency transmission resources non-overlapping with the pre-defined set of time-frequency resources; wherein the geometry indicator signal is transmitted at a power level lower than that of the synchronization signal, and wherein the geometry indicator signal carries a transmitting node identification.

Clause 17. The method of clause 16, wherein the time-frequency transmission resources for the geometry indicator use orthogonal frequency domain multiplexing (OFDM) symbols used by the pre-defined set of time-frequency transmission resources.

Clause 18. The method of clause 16, wherein the transmitting node identification comprises a group identification.

Clause 19. The method of clause 16, wherein the transmitting node identification is encoded using a control frame indicator (CFI) sequence.

Clause 20. A wireless communication apparatus for operation in a heterogeneous network that includes at least one macro node configured to transmit a synchronization signal in a pre-defined set of time-frequency transmission resources, the apparatus comprising: a controller that refrains from transmitting signals using the pre-defined set of time-frequency transmission resource; and a transmitter that transmits a geometry indicator signal at time-frequency transmission resources non-overlapping with the pre-defined set of time-frequency resources; wherein the geometry indicator signal is transmitted at a power level lower than that of the synchronization signal, and wherein the geometry indicator signal carries a transmitting node identification.

Clause 21. The apparatus of clause 20, wherein the time-frequency transmission resources for the geometry indicator use orthogonal frequency domain multiplexing (OFDM) symbols used by the pre-defined set of time-frequency transmission resources.

Clause 22. The apparatus of clause 20, wherein the transmitting node identification comprises a group identification.

Clause 23. The apparatus of clause 20, wherein the transmitting node identification is encoded using a control frame indicator (CFI) sequence.

Clause 24. A processor-readable medium having processor-executable instructions stored thereon, the instructions, when executed, causing a processor to facilitate operation of a micro node in a heterogeneous network that includes at least one macro node configured to transmit a synchronization signal in a pre-defined set of time-frequency transmission resources, by implementing a method comprising: refraining from transmitting signals using the pre-defined set of time-frequency transmission resource; and transmitting a geometry indicator signal at time-frequency transmission resources non-overlapping with the pre-defined set of time-frequency resources; wherein the geometry indicator signal is transmitted at a power level lower than that of the synchronization signal, and wherein the geometry indicator signal carries a transmitting node identification.

Clause 25. A wireless communication apparatus, comprising: means for estimating a first power level of a first signal received from a first node; means for estimating a second power level of a second signal received from a second node; means for calculating a path loss difference value using the first power level estimate and the second power level estimate; and means for adjusting, using the path loss difference value, a third power level of an initial preamble signal transmission to the first node.

Clause 26. A wireless communication apparatus for operation in a heterogeneous network that includes at least one macro node configured to transmit a synchronization signal in a pre-defined set of time-frequency transmission resources, the apparatus comprising: means for transmitting a geometry indicator signal at time-frequency transmission resources non-overlapping with the pre-defined set of time-frequency resources; wherein the geometry indicator signal is transmitted at a power level lower than that of the synchronization signal, and wherein the geometry indicator signal carries a transmitting node identification.

It will be appreciated that various techniques are disclosed for improved operation of macro and micro (low power) nodes in a heterogeneous network are disclosed.

It will further be appreciated that the present document provides several possible ways in which low power nodes and macro base station can be configured to use Geometry Indicator signals in a wireless communication network.

It will further be appreciated that the disclosed techniques enable backoff of uplink power transmission, based on downlink signal powers received from two different base stations. The received signals may occupy non-overlapping REs on same OFDM symbols within a transmission frame, with optional separation between the REs.

It will further be appreciated that the geometry indicator signal can be designed to allow low power nodes to indicate their identities or identities of groups to which they belong, by coding the geometry indicator signal using a code. The use of a code such as the CFI helps reduce complexity because UEs already generate CFI codes for other operations in LTE.

It will also be appreciated that techniques are disclosed in which a Geometry Indicator signal is used as a stand-alone signal that is separate from PSS/SSS signals. Alternatively, GI information may be sent by modifying system signals such as PSS/SSS.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of using Geometry Indicator signals in a wireless cellular network comprising a macro node that provides wireless coverage to a cell and a plurality of low power nodes that operate at least partially within a coverage area of the macro node, comprising:
    associating a cellular identification with each low power node; and
    configuring each low power node to transmit to a user equipment a Geometry Indicator signal, wherein a given Geometry Indicator signal provides information to the user equipment about proximity of a low power node that transmits the given Geometry Indicator signal,
        wherein the given Geometry Indicator signal is in a same symbol as a system signal and occupies one or more subcarriers located adjacent to a set of subcarriers used for the system signal, and
        wherein the given Geometry Indicator signal is transmitted at a first power level lower than a second power level used to transmit the system signal.

2. The method of claim 1, further comprising:
    configuring each low power node to have a same cellular identification; and
    configuring each low power node to transmit a same Geometry Indicator signal.

3. The method of claim 1, further comprising:
    configuring each low power node to have a same cellular identification; and
    configuring at least some low power nodes to transmit Geometry Indicator signals that are different from other Geometry Indicator signals.

4. The method of claim 3, wherein the Geometry Indicator signals include a low power node identification field.

5. The method of claim 1, further comprising:
    configuring the low power nodes to have different low power node identifications and different cellular identifications; and
    configuring at least some of the low power nodes to use a same Geometry Indicator signal, thereby indicating to the user equipment in coverage area of a presence of a low power node cluster.

6. The method of claim 1, further comprising:
    configuring at least some of the low power nodes to have different low power node identifications and different cellular identifications; and
    configuring at least some of the low power nodes to use different Geometry Indicator signals.

7. The method of claim 1, wherein the system signal comprises at least one of a primary synchronization signal, a secondary synchronization signal, a common reference signal and a channel state information reference symbol.

8. The method of claim 1, wherein the one or more subcarriers are not consecutive in frequency.

9. The method of claim 1, wherein the given Geometry Indicator signal and the system signal are separated by a subcarrier on which there is an absence of a transmitted signal.

10. The method of claim 1, wherein the one or more subcarriers include a direct current (DC) subcarrier.

11. The method of claim 1, wherein a number of unused subcarriers reserved for the system signal in six physical resource blocks equals ten.

12. A communication apparatus configured to operate in a wireless cellular network comprising a macro node that provides wireless coverage to a cell and a plurality of low power nodes that operate at least partially within a coverage area of the macro node, the communication apparatus configured to:
associate a cellular identification with each low power node; and
configure each low power node to transmit to a user equipment a Geometry Indicator signal, wherein
a given Geometry Indicator signal provides information to the user equipment about proximity of a low power node that transmits the given Geometry Indicator signal,
wherein the given Geometry Indicator signal is in a same symbol as a system signal and occupies one or more subcarriers located adjacent to a set of subcarriers used for the system signal, and
wherein the given Geometry Indicator signal is configured to be transmitted at a first power level lower than a second power level used to transmit the system signal.

13. The communication apparatus of claim 12, further configured to:
configure each low power node to have a same cellular identification; and
configure each low power node to transmit a same Geometry Indicator signal.

14. The communication apparatus of claim 12, further configured to:
configure each low power node to have a same cellular identification; and
configure at least some low power nodes to transmit Geometry Indicator signals that are different from other Geometry Indicator signals.

15. The communication apparatus of claim 14, wherein the Geometry Indicator signals include a low power node identification field.

16. The communication apparatus of claim 12, further configured to:
configure the low power nodes to have different low power node identifications and different cellular identifications; and
configure at least some of the low power nodes to use a same Geometry Indicator signal, thereby indicating to the user equipment in coverage area of a presence of a low power node cluster.

17. The communication apparatus of claim 12, further configured to:
configure at least some of the low power nodes to have different low power node identifications and different cellular identifications; and
configure at least some of the low power nodes to use different Geometry Indicator signals.

18. The communication apparatus of claim 12, wherein the system signal comprises at least one of a primary synchronization signal, a secondary synchronization signal, a common reference signal and a channel state information reference symbol.

19. The communication apparatus of claim 12, wherein the one or more subcarriers are not consecutive in frequency.

20. The communication apparatus of claim 12, wherein the given Geometry Indicator signal and the system signal are separated by a subcarrier on which there is an absence of a transmitted signal.

21. The communication apparatus of claim 12, wherein the one or more subcarriers includes a direct current (DC) subcarrier.

22. The communication apparatus of claim 12, wherein a number of unused subcarriers reserved for the system signal in six physical resource blocks equals ten.

23. A method of using Geometry Indicator signals in a wireless cellular network comprising a macro node that provides wireless coverage to a cell and a plurality of low power nodes that operate at least partially within a coverage area of the macro node, comprising:
associating a cellular identification with each low power node; and
configuring each low power node to transmit to a user equipment a Geometry Indicator signal, wherein a given Geometry Indicator signal provides information to the user equipment about proximity of a low power node that transmits the given Geometry Indicator signal,
wherein the given Geometry Indicator signal is in a same symbol as a system signal and occupies one or more subcarriers located adjacent to a set of subcarriers used for the system signal, and
wherein the one or more subcarriers include a direct current (DC) subcarrier.

24. The method of claim 23, further comprising:
configuring each low power node to have a same cellular identification; and
configuring each low power node to transmit a same Geometry Indicator signal.

25. The method of claim 23, further comprising:
configuring each low power node to have a same cellular identification; and
configuring at least some low power nodes to transmit Geometry Indicator signals that are different from other Geometry Indicator signals.

26. The method of claim 25, wherein the Geometry Indicator signals include a low power node identification field.

27. The method of claim 23, further comprising:
configuring the low power nodes to have different low power node identifications and different cellular identifications; and
configuring at least some of the low power nodes to use a same Geometry Indicator signal, thereby indicating to the user equipment in coverage area of a presence of a low power node cluster.

28. The method of claim 23, further comprising:
configuring at least some of the low power nodes to have different low power node identifications and different cellular identifications; and
configuring at least some of the low power nodes to use different Geometry Indicator signals.

29. The method of claim 23, wherein the system signal comprises at least one of a primary synchronization signal, a secondary synchronization signal, a common reference signal and a channel state information reference symbol.

30. The method of claim 23, wherein the one or more subcarriers are not consecutive in frequency.

31. The method of claim 23, wherein the given Geometry Indicator signal and the system signal are separated by a subcarrier on which there is an absence of a transmitted signal.

32. The method of claim 23, wherein the given Geometry Indicator signal is transmitted at a first power level lower than a second power level used to transmit the system signal.

33. The method of claim 23, wherein a number of unused subcarriers reserved for the system signal in six physical resource blocks equals ten.

34. A communication apparatus configured to operate in a wireless cellular network comprising a macro node that provides wireless coverage to a cell and a plurality of low power nodes that operate at least partially within a coverage area of the macro node, the communication apparatus configured to:
associate a cellular identification with each low power node; and
configure each low power node to transmit to a user equipment a Geometry Indicator signal, wherein
a given Geometry Indicator signal provides information to the user equipment about proximity of a low power node that transmits the given Geometry Indicator signal,
wherein the given Geometry Indicator signal is in a same symbol as a system signal and occupies one or more subcarriers located adjacent to a set of subcarriers used for the system signal, and
wherein the one or more subcarriers includes a direct current (DC) subcarrier.

35. The communication apparatus of claim 34, further configured to:
configure each low power node to have a same cellular identification; and
configure each low power node to transmit a same Geometry Indicator signal.

36. The communication apparatus of claim 34, further configured to:
configure each low power node to have a same cellular identification; and
configure at least some low power nodes to transmit Geometry Indicator signals that are different from other Geometry Indicator signals.

37. The communication apparatus of claim 36, wherein the Geometry Indicator signals include a low power node identification field.

38. The communication apparatus of claim 34, further configured to:
configure the low power nodes to have different low power node identifications and different cellular identifications; and
configure at least some of the low power nodes to use a same Geometry Indicator signal, thereby indicating to the user equipment in coverage area of a presence of a low power node cluster.

39. The communication apparatus of claim 34, further configured to:
configure at least some of the low power nodes to have different low power node identifications and different cellular identifications; and
configure at least some of the low power nodes to use different Geometry Indicator signals.

40. The communication apparatus of claim 34, wherein the system signal comprises at least one of a primary synchronization signal, a secondary synchronization signal, a common reference signal and a channel state information reference symbol.

41. The communication apparatus of claim 34, wherein the one or more subcarriers are not consecutive in frequency.

42. The communication apparatus of claim 34, wherein the given Geometry Indicator signal and the system signal are separated by a subcarrier on which there is an absence of a transmitted signal.

43. The communication apparatus of claim 34, wherein the given Geometry Indicator signal is configured to be transmitted at a first power level lower than a second power level used to transmit the system signal.

44. The communication apparatus of claim 34, wherein a number of unused subcarriers reserved for the system signal in six physical resource blocks equals ten.

45. A method of using Geometry Indicator signals in a wireless cellular network comprising a macro node that provides wireless coverage to a cell and a plurality of low power nodes that operate at least partially within a coverage area of the macro node, comprising:
associating a cellular identification with each low power node; and
configuring each low power node to transmit to a user equipment a Geometry Indicator signal, wherein a given Geometry Indicator signal provides information to the user equipment about proximity of a low power node that transmits the given Geometry Indicator signal,
wherein the given Geometry Indicator signal is in a same symbol as a system signal and occupies one or more subcarriers located adjacent to a set of subcarriers used for the system signal, and
wherein a number of unused subcarriers reserved for the system signal in six physical resource blocks equals ten.

46. The method of claim 45, further comprising:
configuring each low power node to have a same cellular identification; and
configuring each low power node to transmit a same Geometry Indicator signal.

47. The method of claim 45, further comprising:
configuring each low power node to have a same cellular identification; and
configuring at least some low power nodes to transmit Geometry Indicator signals that are different from other Geometry Indicator signals.

48. The method of claim 47, wherein the Geometry Indicator signals include a low power node identification field.

49. The method of claim 45, further comprising:
configuring the low power nodes to have different low power node identifications and different cellular identifications; and
configuring at least some of the low power nodes to use a same Geometry Indicator signal, thereby indicating to the user equipment in coverage area of a presence of a low power node cluster.

50. The method of claim 45, further comprising:
configuring at least some of the low power nodes to have different low power node identifications and different cellular identifications; and
configuring at least some of the low power nodes to use different Geometry Indicator signals.

51. The method of claim 45, wherein the system signal comprises at least one of a primary synchronization signal, a secondary synchronization signal, a common reference signal and a channel state information reference symbol.

52. The method of claim 45, wherein the one or more subcarriers are not consecutive in frequency.

53. The method of claim 45, wherein the given Geometry Indicator signal and the system signal are separated by a subcarrier on which there is an absence of a transmitted signal.

54. The method of claim 45, wherein the given Geometry Indicator signal is transmitted at a first power level lower than a second power level used to transmit the system signal.

55. The method of claim 45, wherein the one or more subcarriers include a direct current (DC) subcarrier.

56. A communication apparatus configured to operate in a wireless cellular network comprising a macro node that provides wireless coverage to a cell and a plurality of low power nodes that operate at least partially within a coverage area of the macro node, the communication apparatus configured to:
   associate a cellular identification with each low power node; and
   configure each low power node to transmit to a user equipment a Geometry Indicator signal, wherein
      a given Geometry Indicator signal provides information to the user equipment about proximity of a low power node that transmits the given Geometry Indicator signal,
      wherein the given Geometry Indicator signal is in a same symbol as a system signal and occupies one or more subcarriers located adjacent to a set of subcarriers used for the system signal, and
      wherein a number of unused subcarriers reserved for the system signal in six physical resource blocks equals ten.

57. The communication apparatus of claim 56, further configured to:
   configure each low power node to have a same cellular identification; and
   configure each low power node to transmit a same Geometry Indicator signal.

58. The communication apparatus of claim 56, further configured to:
   configure each low power node to have a same cellular identification; and
   configure at least some low power nodes to transmit Geometry Indicator signals that are different from other Geometry Indicator signals.

59. The communication apparatus of claim 58, wherein the Geometry Indicator signals include a low power node identification field.

60. The communication apparatus of claim 56, further configured to:
   configure the low power nodes to have different low power node identifications and different cellular identifications; and
   configure at least some of the low power nodes to use a same Geometry Indicator signal, thereby indicating to the user equipment in coverage area of a presence of a low power node cluster.

61. The communication apparatus of claim 56, further configured to:
   configure at least some of the low power nodes to have different low power node identifications and different cellular identifications; and
   configure at least some of the low power nodes to use different Geometry Indicator signals.

62. The communication apparatus of claim 56, wherein the system signal comprises at least one of a primary synchronization signal, a secondary synchronization signal, a common reference signal and a channel state information reference symbol.

63. The communication apparatus of claim 56, wherein the one or more subcarriers are not consecutive in frequency.

64. The communication apparatus of claim 56, wherein the given Geometry Indicator signal and the system signal are separated by a subcarrier on which there is an absence of a transmitted signal.

65. The communication apparatus of claim 56, wherein the given Geometry Indicator signal is configured to be transmitted at a first power level lower than a second power level used to transmit the system signal.

66. The communication apparatus of claim 56, wherein the one or more subcarriers includes a direct current (DC) subcarrier.

* * * * *